(12) United States Patent
Senoh

(10) Patent No.: US 6,297,767 B1
(45) Date of Patent: Oct. 2, 2001

(54) RESCUE TARGET POSITION INDICATING APPARATUS

(75) Inventor: Akinobu Senoh, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/577,582

(22) Filed: May 25, 2000

(30) Foreign Application Priority Data

Jun. 24, 1999 (JP) ................................... 11-178545

(51) Int. Cl.[7] .............................. G01S 5/02; H04B 7/185
(52) U.S. Cl. ............................ 342/357.08; 342/357.06; 701/213
(58) Field of Search .................. 342/357.06, 357.08; 701/213

(56) References Cited

U.S. PATENT DOCUMENTS 5,838,262 * 11/1998 Kershner et al. ................. 340/945
6,124,825 * 9/2000 Eschenbach ..................... 342/357.08

* cited by examiner

Primary Examiner—Theodore M. Blum
(74) Attorney, Agent, or Firm—Kanesaka & Takeuchi

(57) ABSTRACT

In a rescue target position indicating apparatus of the invention, when a pipper image, which is visible through a combiner of a head mounting type display device attached to a wearer in a flight vehicle, corresponds to a rescue target, the wearer operates an input device, so that an information processing device computes a rescue target position based on a detected result of variables of a detecting device necessary for computing the rescue target position. From a plurality of positions of the flight vehicle, which were updated in the past, an anticipated update position in a next updating time, a plurality of interpolating positions between a position updated in the past closest to the present and the anticipated update position, and an elapsed time to the present from the updated time of the position, which was updated in the past closest to the present, an interpolating position corresponding to the elapsed time is computed. As a position of the flight vehicle used when the position of the rescue target is computed, a position corresponding to the elapsed time is used among the interpolating positions and the positions detected by data outputted from a GPS. Accordingly, the rescue target position indicating apparatus of the invention can indicate the rescue target without losing the same.

5 Claims, 5 Drawing Sheets

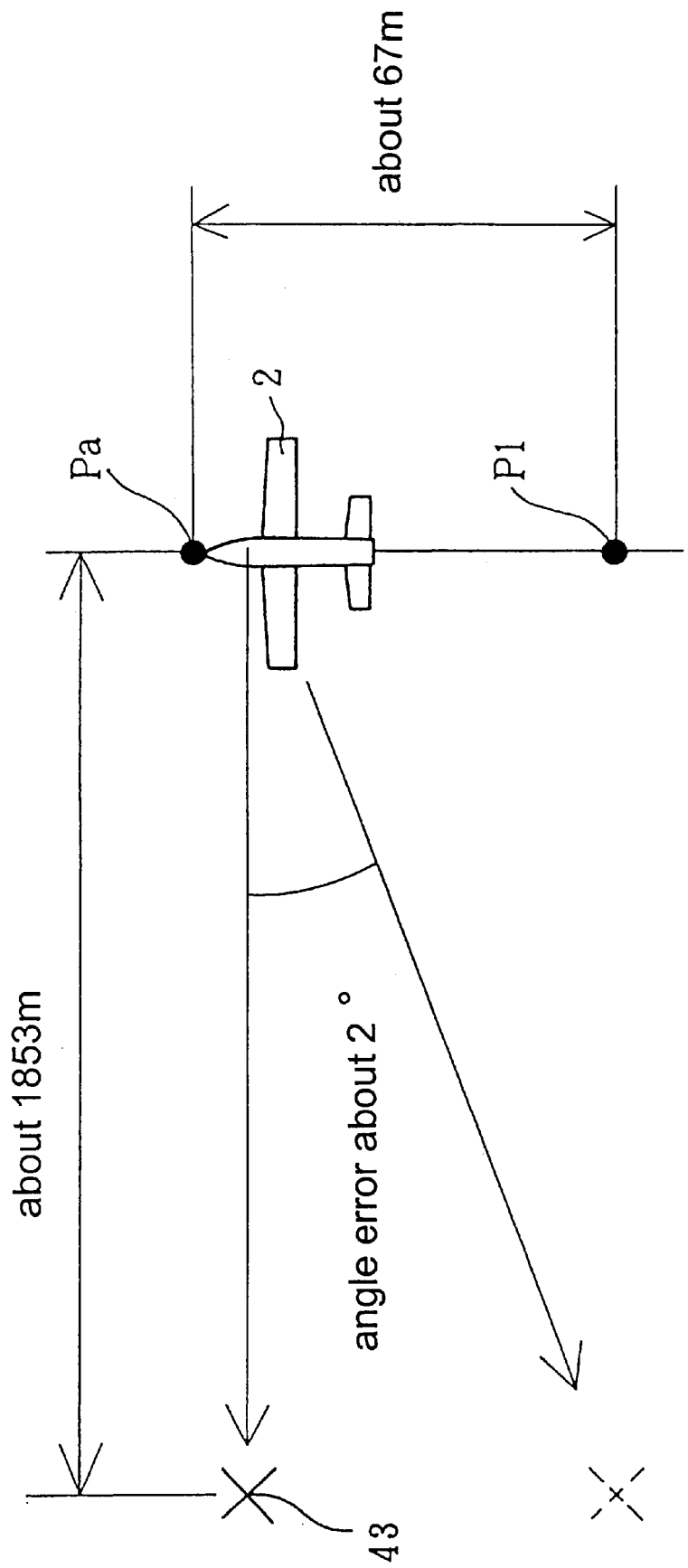

RESCUE TARGET POSITION INDICATING APPARATUS

BACKGROUND OF THE INVENTION AND RELATED ART STATEMENT

The present invention relates to an apparatus for indicating a position or location of a rescue target, such as a wrecked ship and a distressed person, by utilizing a head mounting type displaying device which is worn by a crew or operator of a flight vehicle, such as an airplane or helicopter.

In a rescue activity by a flight vehicle, a rescue target position indicating apparatus used for keeping a found rescue target in sight includes a head mounting type display or indicating device worn by a crew or operator of the flight vehicle; an input device operated by the operator; a detecting device for calculating variables necessary for computing a position of the rescue target; and an information processing device connected to the head mounting type display device, the input device, and the detecting device.

The head mounting type display device has a display which irradiates an image indicating light, and a combiner which changes an optical path of the image display light and allows light from the front to pass therethrough. When a pipper or basic image, which is visible through the combiner, corresponds to the rescue target, the input device is operated by the operator, so that based on the detected result of the detecting device, the position of the rescue target is computed by the information processing device. By an image signal sent from the information processing device to the display, a target symbol image, which indicates the position of the rescue target, is displayed by the head mounting type display device. Accordingly, even if the flight vehicle or the head of the operator is displaced, the position of the rescue target can be indicated by the target symbol image.

Conventionally, as variables used in case of computing the rescue target position, a position corresponding to latitude and longitude of the flight vehicle, a flight altitude, a posture of the flight vehicle and a posture of the head mounting type display device with respect to the flight vehicle are detected.

The position corresponding to the latitude and longitude of the flight vehicle is detected from data outputted by a Global Positioning System (GPS), and updated after a certain time interval. Accordingly, while the update is taken place, the flight vehicle moves, so that an error occurs in the position of the flight vehicle detected by the data outputted by the GPS. Therefore, there is a problem that the target symbol image indicating the position of the rescue target computed based on the detected position of the flight vehicle does not correspond to the actual rescue target, so that the rescue target may be lost in sight.

Accordingly, an object of the present invention is to provide a rescue target position indicating apparatus which can solve the aforementioned problem.

Further objects and advantages of the invention will be apparent from the following description of the invention.

SUMMARY OF THE INVENTION

To achieve the aforementioned object, the present invention is applied to a rescue target position indicating apparatus, comprising: a head mounting type display device attached to a crew or operator of a flight vehicle; an input device operated by the operator; a detecting device for detecting variables necessary for computing a position of a rescue target; an information processing device connected to the head mounting type display device, the input device, and the detecting device. The head mounting type display device includes a display for irradiating image display light, and a combiner for changing an optical path of the image display light and for allowing light from a front to pass therethrough. A position of the flight vehicle is detected from data outputted from a GPS as the variables, and the position of the flight vehicle is updated with a predetermined time interval. When a pipper image which is visible through the combiner corresponds to the rescue target, the input device is operated by the operator or wearer so that the position of the rescue target is computed by the information processing device based on the detected result of the detecting device. Then, an image indicating the computed rescue target position is displayed by the head mounting type displaying device.

In the present invention, the rescue target position indicating apparatus as structure above is provided with means for memorizing a first relation, which is set in advance, between plural positions of the flight vehicle updated in the past and an anticipated update position of the flight vehicle in a next updating time; and means for memorizing a second relation, which is set in advance, among a position of the flight vehicle which was updated in the past closest to the present, the anticipated update position, a plurality of interpolating positions between the position of the flight vehicle updated in the past closest to the present and the anticipated update position, and an elapsed time to the present from an updated time at the position of the flight vehicle, which was updated in the past closest to the present. From the memorized first and second relations and the plural positions of the flight vehicle updated in the past, an interpolating position corresponding to the elapsed time is computed by the information processing device. As the position of the flight vehicle used when the position of the rescue target is computed, among the interpolating position and the positions detected from the data outputted from the GPS, the position corresponding to the elapsed time is used.

According to the structure of the invention, the position of the flight vehicle is detected from the data outputted from the GPS, and the position of the flight vehicle is updated with a predetermined time interval. From the plural positions of the flight vehicle updated in the past, the anticipated update position of the flight vehicle in the next updating time can be specified based on the memorized first relation. From the anticipated update position, the position of the flight vehicle updated in the past closest to the present, and an elapsed time to the present from the updated time at the position of the flight vehicle, which was updated in the past closest to the present, an interpolating position corresponding to the elapsed time can be computed based on the second relation. Among the interpolating position and the positions of the flight vehicle detected from the data outputted from the GPS, by using the position corresponding to the elapsed time, the position of the rescue target is computed. Namely, by interpolating a time period until the position of the flight vehicle detected from the data outputted from the GPS is updated, accuracy of the rescue target position computed based on the position of the flight vehicle can be improved. Also, the image corresponding to the position of the rescue target can be moved smoothly in accordance with the change in the position of the flight vehicle, so as to prevent the image from not responding to the actual rescue target position.

BRIEF DESCRIPTION OF THE DRAWINGS

FIG. 6 is an explanatory view for explaining an operation of the rescue target position indicating apparatus of the embodiment of the invention.

DETAILED DESCRIPTION OF PREFERRED EMBODIMENTS

Hereinafter, embodiments of the present invention will be explained with reference to the attached drawings.

Figure 1:
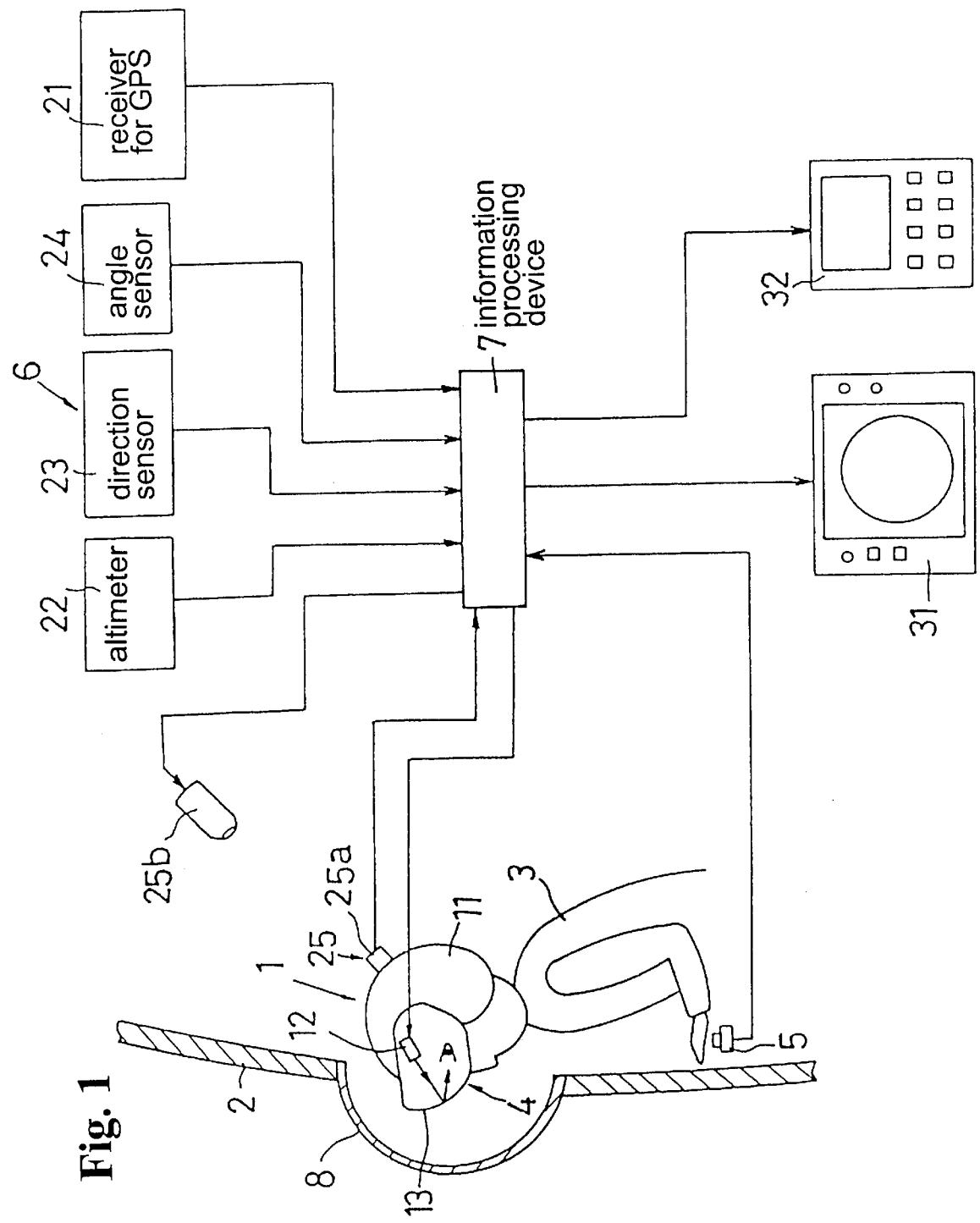
FIG. 1 is a structural explanatory view of a rescue target position indicating apparatus of an embodiment of the invention.

A rescue target position indicating apparatus 1 shown in FIG. 1 includes a head mounting type display device 4 worn by a crew or operator 3 in a flight vehicle 2, such as an airplane or helicopter; an input device 5; a detecting device 6; and an information processing device 7. The operator 3 searches the rescue target through a lookout window 8 on a side surface of the flight vehicle 2.

The head mounting type display device 4 includes a portion for attaching to the head, for example, a helmet 11; a display 12 held by the helmet 11; and a combiner 13 which is also used as a visor and held by the helmet 11 to be located in front of the operator 3. Incidentally, the portion for attaching to the head is not limited to the helmet, and for example, it can be a band-like member fitted around the head. The display 12 is, for example, formed of a flat panel display, CRT or the like, and irradiates a display light corresponding to an image signal sent from the information processing device 7. The combiner 13 changes an optical path of the display light irradiated from the display 12 to guide the light to eyes of the operator 3. Accordingly, an image is formed in front of the operator 3. As the combiner 13, for example, a half mirror or hologram element can be used. In case the half mirror is used, it changes the optical path of the display light by reflection; and in case the hologram element is used, the optical path of the display light is changed by the diffraction. The combiner 13 allows light from the front to penetrate therethrough, so that both the image and an object actually existing in front of the combiner 13 are visible to the operator 3.

The input device 5 is formed of, for example, a push button switch, and operated by the operator 3 so that an input signal is outputted to the information processing device 7.

The detecting device 6 detects or obtains variables which are necessary to compute the rescue target position. To obtain the variables, the detecting device 6 includes a receiver 21 for a GPS, which detects a position corresponding to latitude and longitude of the flight vehicle 2 from data outputted from the GPS; an altimeter 22 for detecting a flight altitude of the flight vehicle 2; as a posture of the flight vehicle 2, a direction sensor 23 for detecting a direction of a nose of the flight vehicle, and an angle sensor 24 for detecting a bank angle, that is, an inclination in right and left directions; and a head motion tracer 25 which detects a slope angle or an inclination angle of the head as a posture of the head mounting type display device 4 from a condition that a direction of a sight of the wearer 3 is oriented in the right and left directions of the flight vehicle 2.

The position of the flight vehicle 2 detected from the data outputted from the GPS is updated after a certain time interval. In this embodiment, the time interval for updating the position of the flight vehicle 2 is set at one second.

The head motion tracker 25 has a sensor 25a attached to the helmet 11, and a source 25b attached to the flight vehicle, and by detecting a signal of the source 25b by the sensor 25a, a signal corresponding to the line of sight of the operator 3 with respect to the flight vehicle 2 is outputted.

The information processing device 7 is formed of a computer, and is connected to the input device 5, the display 12, the receiver 21 for the GPS, the altimeter 22, the direction sensor 23, the angle sensor 24, and the head motion tracker 25. The information processing device 7 is further connected to a radar scope 31 and a navigation display device 32.

Figure 2:
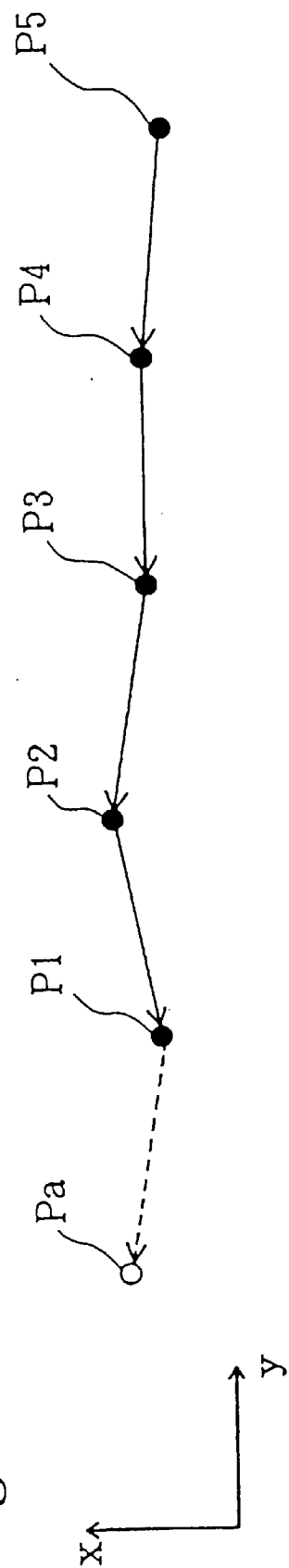
FIG. 2 is an explanatory view of updated positions of a flight vehicle detected by data outputted from a GPS in the rescue target position indicating apparatus of the embodiment of the invention.

The information processing device 7 memorizes a first relation, which is set in advance, between plural positions of the flight vehicle 2 updated in the past and an anticipated position of the flight vehicle 2 at a next updating time. For example, in an x-y coordinate system along a horizontal plane shown in FIG. 2, among five positions of the flight vehicle 2, which were updated in the past, in case a coordinate of a position P1, which is the closest to the present, constitutes (x1, y1); a coordinate of a position P2, which is the second closest to the present, constitutes (x2, y2); a coordinate of a position P3, which is the third closest to the present, constitutes (x3, y3); a coordinate of a position P4, which is the forth closest to the present, constitutes (x4, y4); a coordinate of a position P5, which is the fifth closest or the furthest to the present, constitutes (x5, y5); and a coordinate of an anticipated update position of the flight vehicle 2 in the next updating time constitutes (xa, ya), as the first relation, the following equations (1) and (2) are memorized.

$$xa-x1=\{(x1-x2)+(x1-x3)/2+(x1-x4)/3+(x1-x5)/4\}/4 \quad \text{Equation (1)}$$

$$ya-y1=\{(y1-y2)+(y1-y3)/2+(y1-y4)/3+(y1-y5)/4\}/4 \quad \text{Equation (2)}$$

Namely, according to the first relation, both in an $\underline{x}$ direction and a $\underline{y}$ direction, a distance from each of the positions P2, P3, P4, P5 to the position P1 of the flight vehicle 2 which was updated in the past closest to the present is obtained; a value corresponding to the updating time interval of the respectively obtained distances is obtained; and a position spaced with the obtained average value from the position P1 of the flight vehicle, which was updated in the past closest to the present, constitutes the anticipated update position Pa.

Figure 3:
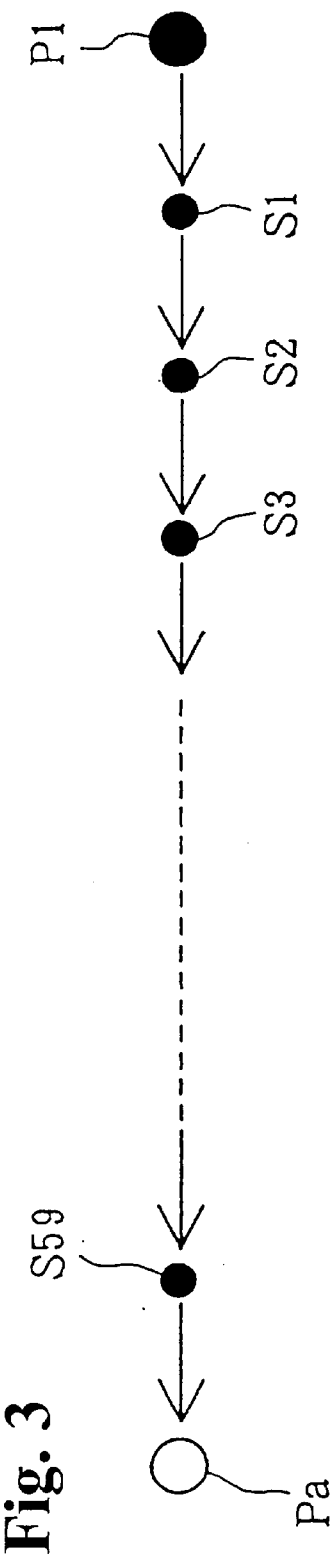
FIG. 3 is an explanatory view showing interpolating positions of the flight vehicle in the rescue target position indicating apparatus of the embodiment of the invention.

Also, the information processing device 7 memorizes a second relation, which is set in advance, among the position P1 of the flight vehicle 2, which was updated in the past closest to the present, the anticipated update position Pa, plural interpolating positions between the position P1 of the vehicle 2 updated in the past closest to the present and the anticipated update position Pa, and an elapsed time to the present from an updating time of the position P1 of the flight vehicle in the past closest to the present. For example, as shown in FIG. 3, a distance between the position P1 of the flight vehicle updated in the past closest to the present and the anticipated update position Pa is equally and plurally divided; the respective equally divided points are designated as interpolating positions S1, S2, S3 . . . S59; a number of interpolating positions corresponding to an elapsed time to the present from the updating time, when the position P1 of the flight vehicle 2 was updated in the past closest to the present, is designated as n; and a coordinate of an interpolating position Sn, which is nth position away from the position P1 of the flight vehicle 2 which was updated in the past closest to the present, in the aforementioned x-y coordinate system constitutes (xan, yan). In this case, the following equations (3) and (4) are memorized as the second relation. In the embodiment, a number of divisions between the position P1 of the flight vehicle 2 which was updated in the past closest to the present and the anticipated update position Pa is set to sixty equal to a number of frames of the images of the head mounting type display device 4 in the updating time interval, that is, one second.

$$xan-x1 = (xa-x1) \times n/60 \qquad \text{Equation (3)}$$

$$xan-y1 = (ya-y1) \times n/60 \qquad \text{Equation (4)}$$

Namely, according to the second relation, in the respective x direction and y directions, a distance from the position P1 of the flight vehicle 2, which was updated in the past closest to the present, to the anticipated update position Pa at the next updating time is obtained; an interval of the interpolating positions is obtained by dividing the obtained distance by a value adding one to the number of the interpolating positions; a value is obtained which is resulted from the interval of the interpolating positions multiplied by the number n of the interpolating positions corresponding to the elapsed time to the present from the update time when the position P1 of the flight vehicle 2 was updated in the past closest to the present; and a position spaced with the obtained value from the position P1 of the flight vehicle which was updated in the past closest to the present constitutes an interpolating position corresponding to the elapsed time.

Figure 4A:
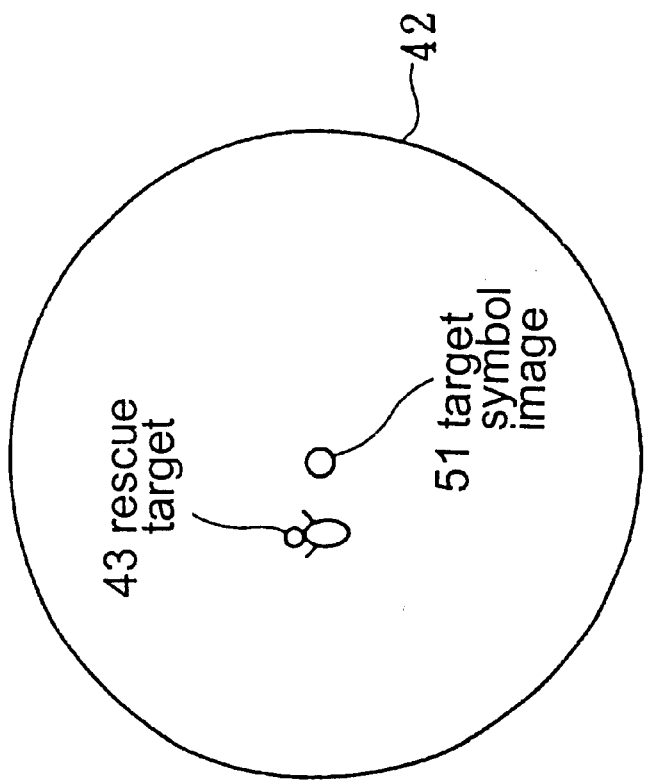
FIGS. 4(A) and 4(B) are views showing display images by a head mounting type display device in the rescue target position indicating apparatus of the embodiment of the invention.

The information processing device 7 sends an image signal, for example, for displaying a pipper image 41 as shown in FIG. 4(A). The operator 3 sees the pipper image 41, which is visible through the combiner 13 in a display visual field 42 of the head mounting type display device 4, and a search scope, such as sea, which is visible through the combiner 13.

When the pipper image 41, which is visible through the combiner 13, corresponds to the rescue target, the operator 3 operates the input device 5, so that the position of the rescue target is computed or operated by the information processing device 7 based on the result detected by the detecting device 6. As the position of the flight vehicle 2 used when the position of the rescue target is computed, among the interpolating positions and the positions detected by the data outputted from the GPS, the position corresponding to the elapsed time to the present from the updated time of the position P1, which was updated in the past closest to the present, is used. Namely, in case the elapsed time from the updated time of the position P1 of the flight vehicle in the past closest to the present is shorter than a time which is necessary for the flight vehicle 2 to reach the first interpolating position S1, the rescue target position is computed by using the position detected by the data outputted from the GPS. In case the elapsed time from the updated time of the position P1 of the flight vehicle in the past closest to the present is longer than the time which is necessary for the flight vehicle 2 to reach the first interpolating position S1, the rescue target position is computed by using the position where the flight vehicle reaches last.

Figure 4B:
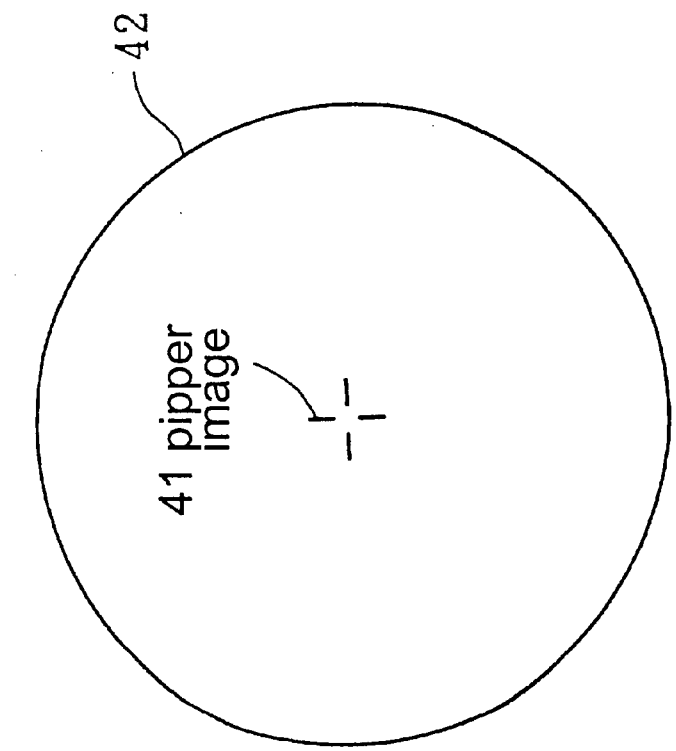

The information processing device 7 sends an image signal to the display 12 based on the position of a computed position of the rescue target 43. The display 12 irradiates the display light by the image signal, so that a target symbol image 51 indicating the rescue target position in FIG. 4(B) is formed to be visible.

Figure 5:
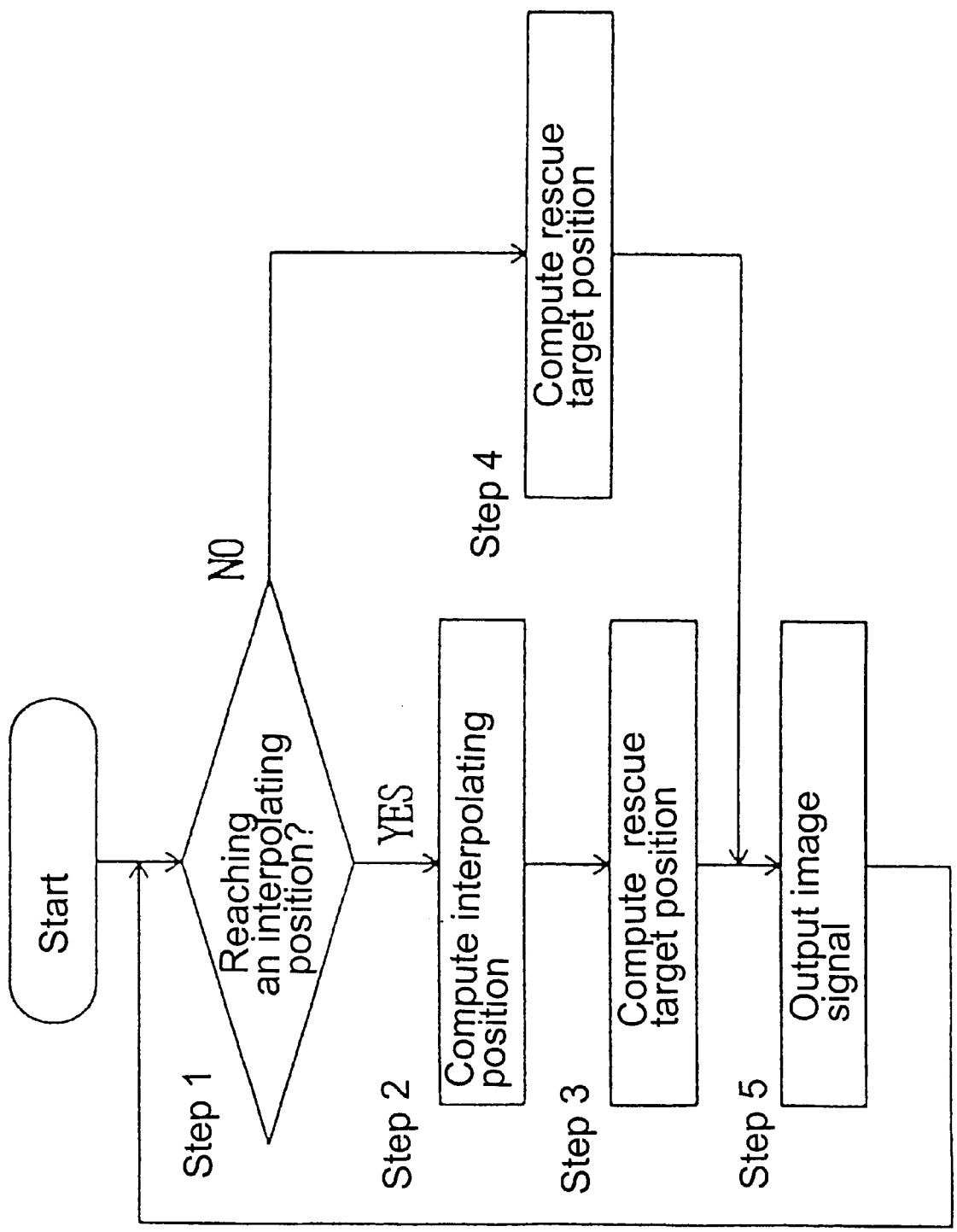
FIG. 5 is a flow chart showing processes of forming a target symbol image in the rescue target position indicating apparatus of the embodiment of the invention.

A flow chart of FIG. 5 shows forming processes of the target symbol image 51. Firstly, when the operator 3 finds the rescue target 43 and operates the input device 5, it is determined whether a period of time, which is necessary for the flight vehicle 2 to reach the first interpolating position Si, is elapsed or passed after the position of the flight vehicle 2 detected by the data outputted from the GPS is updated (step 1). In case the time is elapsed, the information processing device 7 computes the interpolating position Sn corresponding to the elapsed time to the present from the updated time of the position P1 of the flight vehicle 2, which was updated in the past closest to the present, by using the formulas (1) through (4) corresponding to the memorized or stored first and second relations, and the plural positions P1 through P5 of the flight vehicle updated in the past (step 2). By using the computed interpolating position Sn and the result detected by the detecting means 22 through 25 other than the receiver 21 for the GPS, the information processing device 7 computes the position of the rescue target (step 3). In the step 1, in case the time, which is necessary for the flight vehicle 2 to reach the first interpolating position Si, is not elapsed, by using the position of the flight vehicle 2, which is detected from the data outputted from the GPS, and the results detected by the detecting means 22 through 25 other than the receiver 21 for the GPS, the information processing device 7 computes the position of the rescue target (step 4). Thereafter, an image signal for forming the target symbol image 51, which corresponds to the computed position of the rescue target 43, is outputted to the head mounting type display device 4 (step 5).

According to the aforementioned structure, by interpolating a position until the position of the flight vehicle 2 detected by the data outputted from the GPS is updated, an accuracy of the position of the rescue target 43, which is computed based on the position of the flight vehicle 2, can be improved. Also, the target symbol image 53 corresponding to the position of the rescue target 43 is smoothly moved in accordance with a change in the position of the flight vehicle 2, so as to prevent the target symbol image 53 from not responding to the actual rescue target position 43.

For example, in FIG. 6, it is presumed that when the operator 3 finds the rescue target 43 and operates the input device 5, the position of the flight vehicle 2, which is detected by the data outputted from the GPS, has been updated already, and the flight vehicle 2 proceeds approximately 67 m until the next updating time, and a distance from the flight vehicle 2 to the rescue target 43 is 1,853 m. In this case, if the position of the rescue target 43 is computed by using the position P1 of the flight vehicle 2 which was updated in the past closest to the present as in the conventional apparatus, the computed position is deviated, as shown by broken lines in the figure, from the actual position of the rescue target 43, and there is an error of 2° in the angle of the visible direction from the wearer 3 in the horizontal plane. Also, the position of the target symbol image 51 does not correspond to the actual position of the rescue target 43. Furthermore, since the position of the target symbol image 51 moves only when the position of the flight vehicle 2 is updated, a following ability thereof with respect to the movement of the flight vehicle 2 is poor.

On the other hand, in the aforementioned embodiment, the error from the actual position of the rescue target 43 of the computed position of the flight vehicle 2 is decreased, and the position of the target symbol image 51 corresponds to the actual position of the rescue target 43. Furthermore, the position of the target symbol image 51 smoothly moves by following the movement of the flight vehicle 2.

The present invention is not limited to the aforementioned embodiment. For example, a number of the positions of the flight vehicle, which were updated in the past, in the first relation, or a number of the interpolating positions in the second relation are not specially limited.

According to the present invention, the rescue target position indicating apparatus, which can surely indicate the rescue target without losing the same, can be provided.

While the invention has been explained with reference to the specific embodiments of the invention, the explanation is illustrative and the invention is limited only by the appended claims.

What is claimed is:

1. A rescue target position indicating apparatus, comprising:

a head mounting type indicating device to be worn by an operator of a flight vehicle, said indicating device having a display for irradiating an image display light, and a combiner for changing an optical path of the image display light and allowing light from a front to pass therethrough, an input device operated by the operator, a detecting device for obtaining variables necessary for computing a position of a rescue target, said variables including data outputted from a GPS to be used for detecting a position of the flight vehicle updated with a predetermined time interval, an information processing device connected to the indicating device, the input device and the detecting device, said information processing device computing a rescue target position based on a result from the detecting device upon operating the input device by the operator when a pipper image visible through the combiner corresponds to the rescue target so that said indicating device indicates an image indicating said rescue target position, first memory for memorizing a first relation set in advance between at least one position of said flight vehicle updated in a past and an anticipated update position of the flight vehicle in a next updating time, and second memory for memorizing a second relation set in advance among a position of the flight vehicle updated in the past closest to the present, the anticipated update position, a plurality of interpolating positions between the position of the flight vehicle updated in the past closest to the present and the anticipated update position, and an elapsed time period to a present from the updated time when the position of the flight vehicle was updated in the past closest to the present, said information processing device computing an interpolating position corresponding to the elapsed time from the first relation, the second relation and the at least one position of the flight vehicle updated in the past, a position corresponding to the elapsed time being selected from one of the interpolating positions and the position detected from the data outputted from the GPS and being used as a position of the flight vehicle when the rescue target position is computed.

2. A rescue target position indicating apparatus according to claim 1, wherein a period between two of the update timings is constant and is divided by a predetermined fixed value to obtain interpolating timings corresponding to the interpolating positions, said elapsed time period being compared with the interpolating timings to select a nearest interpolating timing, which is used to determine the position of the flight vehicle.

3. A rescue target position indicating apparatus according to claim 2, wherein said position of the flight vehicle when the input device is actuated is calculated from a position at the updated time nearest to the present based on a speed, direction and angle of the flight vehicle.

4. A rescue target position indicating apparatus according to claim 3, wherein the rescue target position is determined from the position of the flight vehicle based on a direction and angle from the flight vehicle and a height of the flight vehicle.

5. A rescue target position indicating apparatus according to claim 2, wherein the image display light from the indicating device is renewed by the interpolating timings.

* * * * *